US012330321B2

(12) United States Patent
Chopra

(10) Patent No.: US 12,330,321 B2
(45) Date of Patent: Jun. 17, 2025

(54) OUT-THE-FRONT DOUBLE-ACTION KNIFE

(71) Applicant: Deepak C. Chopra, Livermore, CA (US)

(72) Inventor: Deepak C. Chopra, Livermore, CA (US)

( * ) Notice: Subject to any disclaimer, the term of this patent is extended or adjusted under 35 U.S.C. 154(b) by 334 days.

(21) Appl. No.: 18/304,925

(22) Filed: Apr. 21, 2023

(65) Prior Publication Data

US 2024/0351226 A1 Oct. 24, 2024

(51) Int. Cl.
*B26B 1/08* (2006.01)
*B26B 1/10* (2006.01)
*B26B 11/00* (2006.01)

(52) U.S. Cl.
CPC .................. *B26B 1/08* (2013.01); *B26B 1/10* (2013.01); *B26B 11/00* (2013.01)

(58) Field of Classification Search
CPC ......... B26B 11/00; B26B 5/005; B26B 5/003; B26B 5/001; B26B 5/00; B26B 1/10; B26B 1/08
USPC ........................................................... 30/162
See application file for complete search history.

(56) References Cited

U.S. PATENT DOCUMENTS 2,632,949 A * 3/1953 Falcone .................... B26B 1/08 30/162
4,139,939 A * 2/1979 Crooks ..................... B26B 1/08 30/162
4,769,912 A * 9/1988 Davis ........................ B26B 1/08 30/162
5,537,750 A * 7/1996 Seber ...................... B26B 1/044 7/118
6,085,423 A * 7/2000 Marifone .................. B26B 1/08 30/162
6,701,621 B2 * 3/2004 Kain ....................... B26B 1/046 30/160
8,595,941 B2 * 12/2013 Lee .......................... B26B 1/08 30/162
8,671,578 B1 * 3/2014 Frazer ....................... B26B 1/08 30/162
9,056,398 B2 * 6/2015 Liao ........................ B26B 5/001
9,375,854 B2 * 6/2016 Chu .......................... B26B 1/08
9,498,889 B1 * 11/2016 Hawk ........................ B26B 1/08
9,764,485 B1 * 9/2017 Hawk ........................ B26B 1/04
10,112,312 B2 * 10/2018 Schekalla ............... B26B 5/003
10,220,527 B1 * 3/2019 Marfione .................. B26B 1/08
D870,532 S * 12/2019 Marfione ......................... D8/99
D871,187 S * 12/2019 Marfione ......................... D8/99
10,500,740 B1 * 12/2019 Marfione .................. B26B 1/08
D871,887 S * 1/2020 Marfione ......................... D8/99
D886,563 S * 6/2020 Marfione ......................... D8/99
D889,239 S * 7/2020 Marfione ......................... D8/99
10,807,253 B1 * 10/2020 Mandeville ............... B26B 1/08
(Continued)

*Primary Examiner* — Jonathan G Riley

(57) ABSTRACT

An out-the-front (OTF) knife comprises a handle, a blade, a support frame, and a double-action actuation mechanism. The handle comprises a blade channel, an axel channel, and an actuation mechanism channel. The actuation mechanism includes actuation springs. The actuation mechanism is configured in the actuation mechanism channel so that the actuation springs facilitates the deployment and retraction of the blade. A user manipulates a toggle switch which initiates the actuation mechanism. The handle further comprises a double locking securement system with a set of back locks and a set of front locks.

15 Claims, 8 Drawing Sheets

(56) References Cited

U.S. PATENT DOCUMENTS

| | | | | | |
|---|---|---|---|---|---|
| D903,459 | S | * | 12/2020 | Marfione | D8/99 |
| D903,460 | S | * | 12/2020 | Marfione | D8/99 |
| 10,889,013 | B2 | * | 1/2021 | Scimone | B26B 5/001 |
| 11,207,790 | B2 | * | 12/2021 | Buerk | B26B 3/06 |
| 11,358,291 | B2 | * | 6/2022 | Buerk | B26B 1/08 |
| 11,607,818 | B1 | * | 3/2023 | Crawford | B26B 1/08 |
| 11,639,006 | B1 | * | 5/2023 | Chumchal | B26B 5/001 30/162 |
| 11,826,920 | B1 | * | 11/2023 | Mandeville | B26B 5/003 |
| 12,005,594 | B1 | * | 6/2024 | Marfione | B26B 1/10 |
| 12,257,729 | B1 | * | 3/2025 | Marfione | B26B 1/08 |
| 2006/0207102 | A1 | * | 9/2006 | Bezold | B26B 1/08 30/162 |
| 2007/0175045 | A1 | * | 8/2007 | McHenry | B26B 1/08 30/162 |
| 2008/0222895 | A1 | * | 9/2008 | Marfione | B26B 11/00 30/151 |
| 2008/0222897 | A1 | * | 9/2008 | Marfione | B26B 1/08 30/162 |
| 2009/0235534 | A1 | * | 9/2009 | Chu | B26B 1/08 30/162 |
| 2012/0255179 | A1 | * | 10/2012 | Moizis | B26B 1/08 30/162 |
| 2014/0101943 | A1 | * | 4/2014 | Chu | B26B 1/08 30/162 |
| 2014/0173911 | A1 | * | 6/2014 | Chu | B26B 1/08 30/162 |
| 2021/0276204 | A1 | * | 9/2021 | Marfione | B26B 1/10 |
| 2021/0299893 | A1 | * | 9/2021 | Eckelkamp | B26B 1/10 |
| 2022/0055233 | A1 | * | 2/2022 | Delplanche | B26B 1/08 |
| 2022/0388186 | A1 | * | 12/2022 | King | B26B 7/00 |

* cited by examiner

OUT-THE-FRONT DOUBLE-ACTION KNIFE

FIELD OF THE INVENTION

The present invention relates generally to an out-the-front knife and more specifically to an out-the-front knife with a double locking mechanism for increased strength and safety.

BACKGROUND OF THE INVENTION

An out-the-front knife (OTF) is a knife with a blade that deploys and retracts through an opening in the end of the handle. Other knife configurations are available such as folding knives, fixed blades, and switchblades. OTF knife styles are various with the main styles being manual, single action, and double action. Manual are OTF knives that deploy and retract by a user manually deploying and retracting the blade. A single action OTF knife is a style where the user activates an automatic deployment mechanism but manually retracts the blade. A double action OTF knife is a style where the user activates and automatic actuation mechanism to deploy the blade and the activates the automatic actuation mechanism again to retract the blade. The double action OTF knife style typically has a locking mechanism to lock the blade in the deployed and retracted positions. The locking mechanisms are sometimes prone to failure which can result in injury to the user. The locking mechanisms typically utilize a single front and a single back lock for locking the blade in a deployed and retracted position, respectively.

The objective of the present invention is to provide an improved safety system with a double set of locks. The two sets of front and back locks improve the strength of locking system and thereby increase the safety for the user.

SUMMARY OF THE INVENTION

An out-the-front knife comprises a handle having a toggle switch, a blade, a support frame, and an actuation mechanism. The handle defines a blade channel and an actuation mechanism channel. The blade channel receives the blade and is configured to allow the blade to travel along the blade channel to a deployed and a retracted position. The support frame is operably configured to a toggle switch. The toggle switch allows a user to activate the actuation mechanism by sliding the toggle switch in a forward or reverse direction thereby guiding the support frame in a likewise direction. The forward or reverse direction allows the support frame to press and disengage the appropriate set of locks which releases the blade for travel within the blade channel. The actuation mechanism comprises a front locking bar, a back locking bar, and at least one actuation spring. The support frame is configured with the actuation mechanism, so the front locking bar is in contact with the front side of the support frame and the back locking bar is in contact with the back side of the support frame. The front and back locking bars are tethered together by the actuation spring. When the blade is in the retracted position, the user slides the toggle switch forward thereby assisting the support frame in the same direction. The back locking bar comes in contact with the blade back end. As the support frame moves forward, the support frame presses on the back locks unlocking the blade for travel in a forward direction which the blade's travel is facilitated by the tension in the actuation spring. The tension is built up since the front locking bar is in contact with the front side of the support frame that is moving forward and the back locking bar is in contact with the stationary blade.

The blade remains stationary until enough tension builds to initiate the blade's movement. When the blade is in the deployed position, the user slides the toggle switch in a backward direction assisting the support frame in a backward direction as well. The front locking bar comes in contact with an axel of the blade. As the support frame moves forward, the support frame presses on the front locks releasing the blade to travel in a backward direction which is facilitated by the tension in the actuation spring. The tension is built up since the front locking bar is in contact with the axel and the back locking bar is in contact with the support frame which is sliding back thereby stretching the actuation spring. The blade remains stationary until enough tension has been builds to initiate the blade's movement.

DETAIL DESCRIPTIONS OF THE INVENTION

Figure 1:
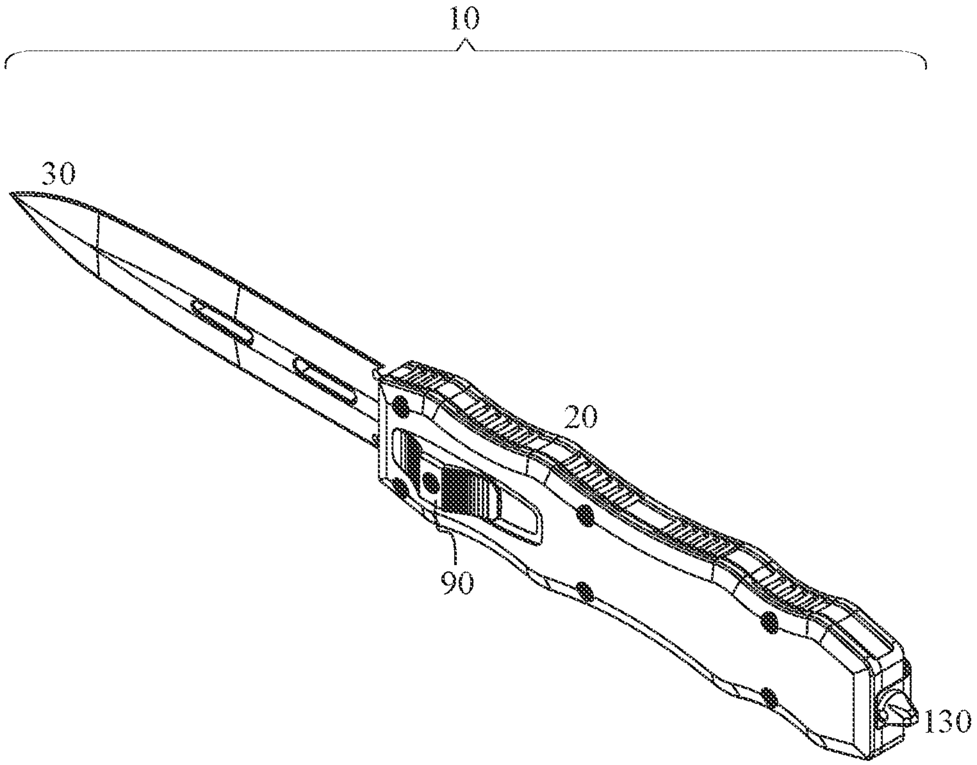
FIG. 1 is a top perspective view of the present invention.

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

"First", "second" etc. as contained herein are terms used as labels for nouns that they precede and do not imply ordering.

Double-action out-the-front knives rely on locking springs to assist in locking the blade in deployed or retracted positions. As the knife is used, the locking springs can lose their spring tension which can result in unintentional retraction of the blade while in use. This unintentional actuation of the blade can result in injury to the user or bystander. If the locking springs of the knife lose spring tension, the actuation mechanism has an easier opportunity for being activated by accidental means whether by the actuation button getting snagged on the edge of clothing or object as the knife is placed in a pocket or in a drawer for instance. The blade would be deployed with unintentional consequences.

Figure 3:
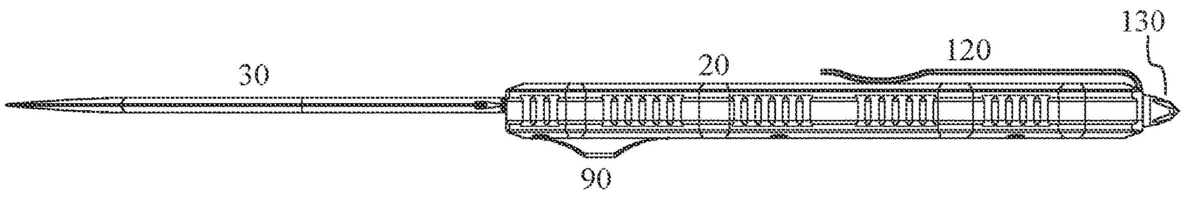
FIG. 3 is a right-side view of the present invention.
Figure 7A:
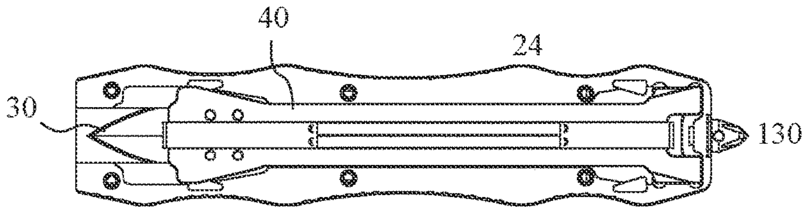
FIG. 7A is a cut away view of the present invention in the retracted position.
Figure 7B:
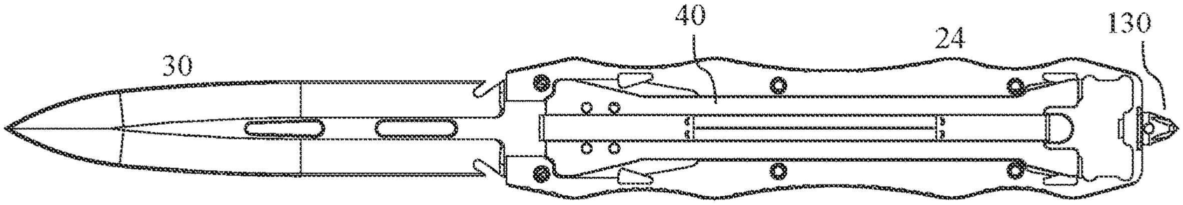
FIG. 7B is a cut away view of the present invention in the deployed position.

The out-the-font (OTF) knife 10 shown in FIG. 1 and FIG. 3 comprises a handle 20 and a blade 30. The OTF knife 10 further comprises a toggle switch 90. The toggle switch 90 is used to activate the operation of the OTF knife 10. As the toggle switch 90 is slid toward the back of the OTF knife 10 along an allowed toggle travel length and while in a deployed position as shown in FIG. 1 and FIG. 7B, the toggle switch 90 activates the operation of the OTF knife 10 and the blade 30 is retracted fully into the handle 20. While in the retracted position as shown in FIG. 7A, the toggle switch 90 is slid toward the front of the OTF knife 10 along the allowed toggle travel length which activates the operation of the OTF knife 10 and the blade 30 is deployed at least partially from the handle 20.

Figure 2:
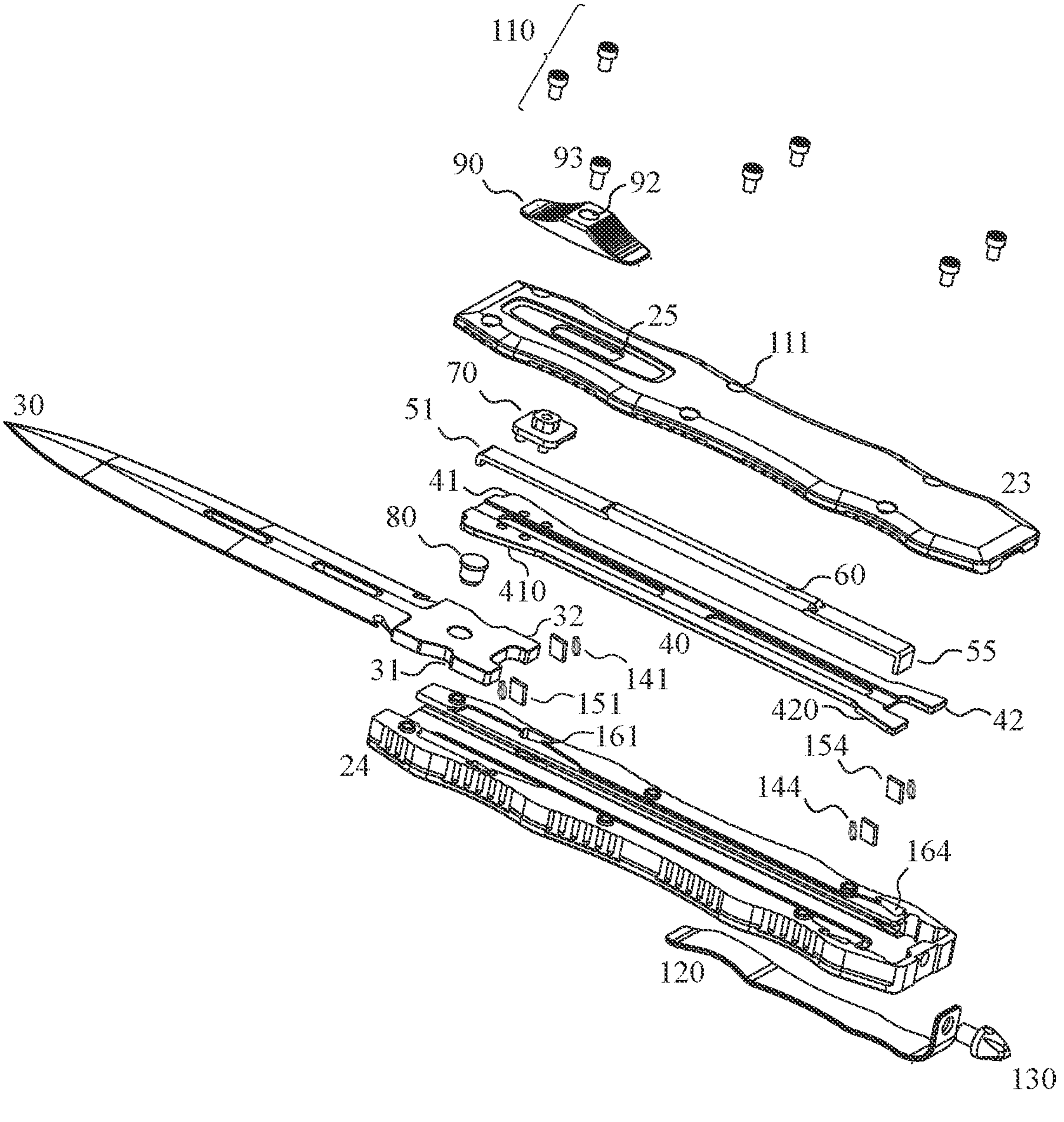
FIG. 2 is a top perspective exploded view of the present invention.
Figure 4:
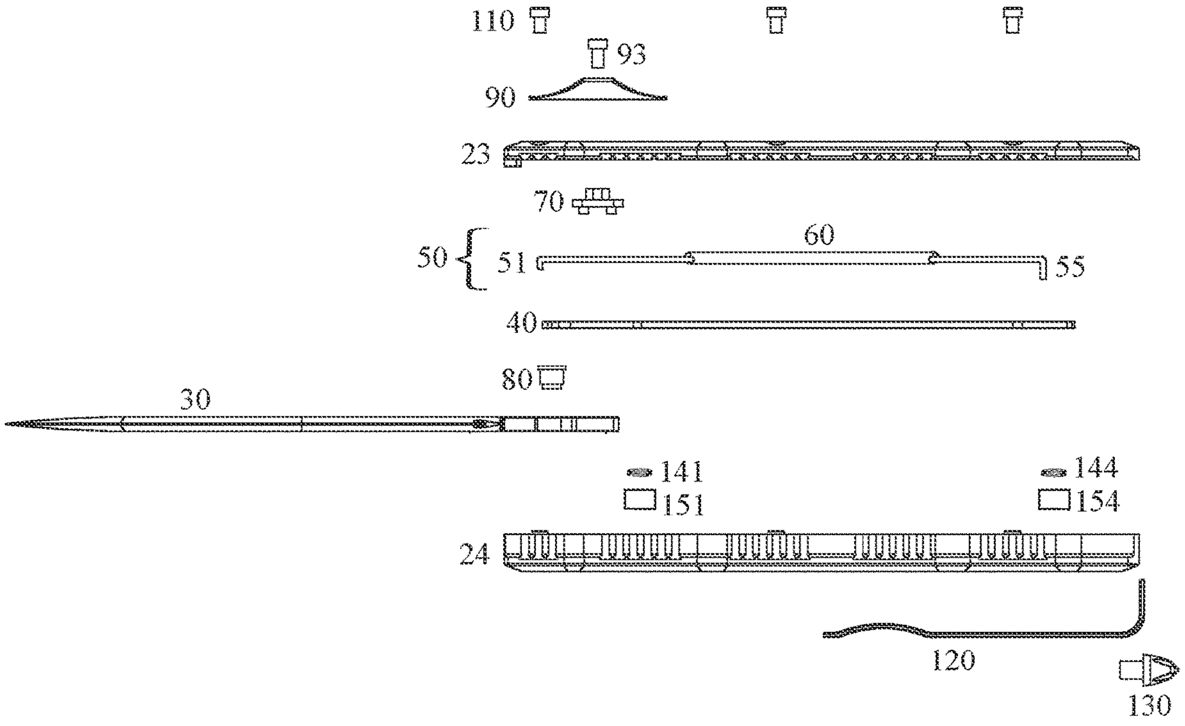
FIG. 4 is a right-side exploded view of the present invention.
Figure 5:
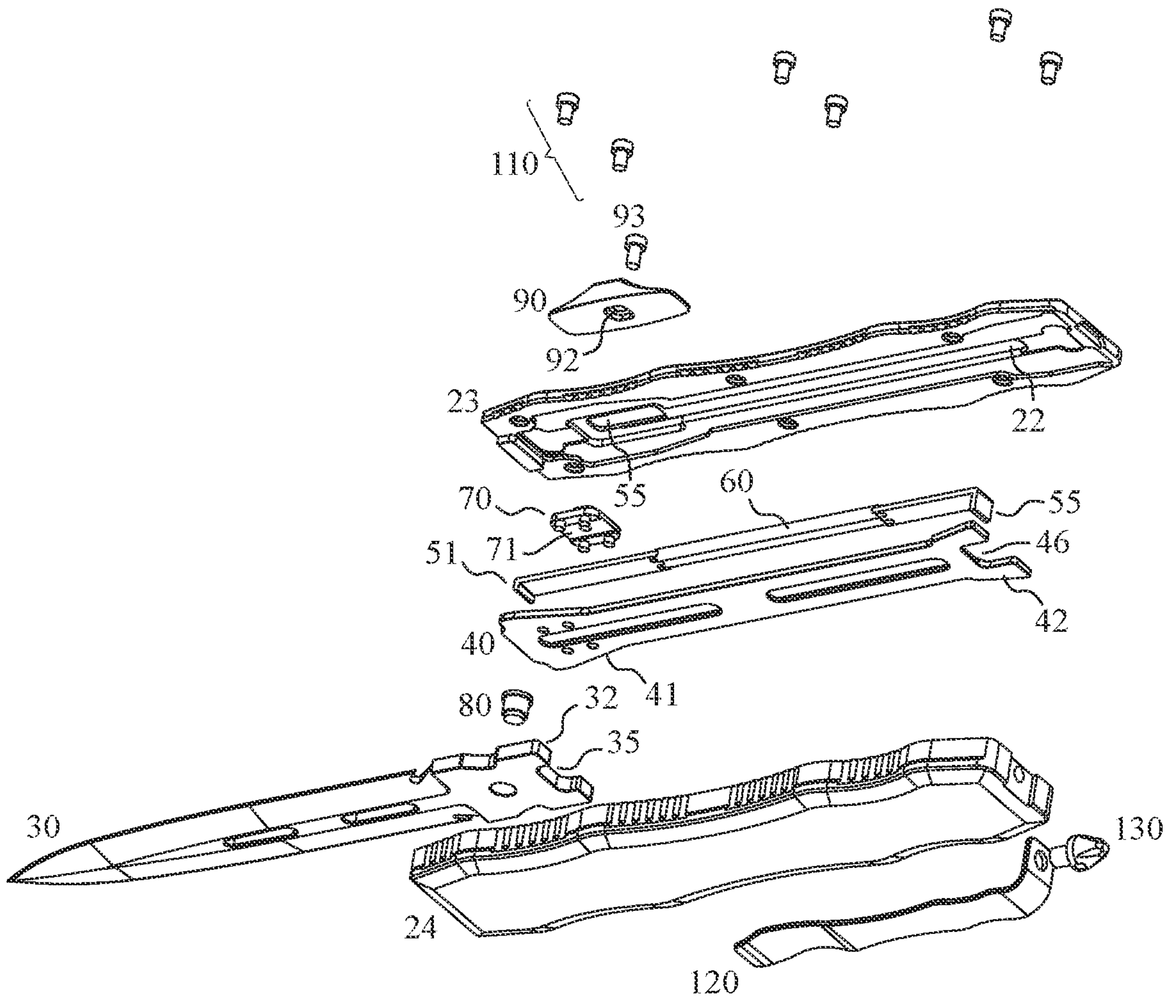
FIG. 5 is a bottom perspective exploded view of the present invention.

As shown in FIG. 2 and FIG. 4 to FIG. 5, the handle 20 comprises a top shell 23 and a bottom shell 24, an open end, a plurality of fasteners 110 and a plurality of fastener holes 111. The top shell 23 is fastened to the bottom shell 24 with the plurality of fasteners 110. In the first preferred embodiment, the plurality of fasteners 110 are bolts but are not limited to this type of fastener. In alternative embodiments, the plurality of fasteners 110 could be pins, rivets, screws and the same without limit. The handle 20 further comprises a plurality of locking paddles, a plurality of locking springs, and a plurality of locking cavities. The plurality of locking cavities each receives one of the plurality of locking paddles and one of the plurality of locking springs. In the first preferred embodiment, the handle 20 comprises a set of front locking paddles 151, a set of front locking springs 141, a set of front locking cavities 161, a set of back locking paddles 154, a set of back locking springs 144, and a set of back locking cavities 164. The handle 20 further comprises a clip 120 and a breaker nub 130. The breaker nub 130 comprises a hardened nub and an attachment stem. The hardened nub being suitable for breaking glass and other surfaces in case of emergencies. The attachment stem protruding from the back of the hardened nub for attaching the breaker nub 130 to a back side of the handle 20. The clip 120 is fastened to the handle 20 by the breaker nub 130 and a clip hole included in the handle 20. The clip is used for mounting the OTF knife 10 to objects.

Figure 6A:
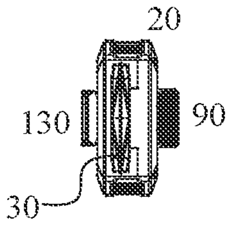
FIG. 6A is a front perspective view of the present invention.
Figure 6B:
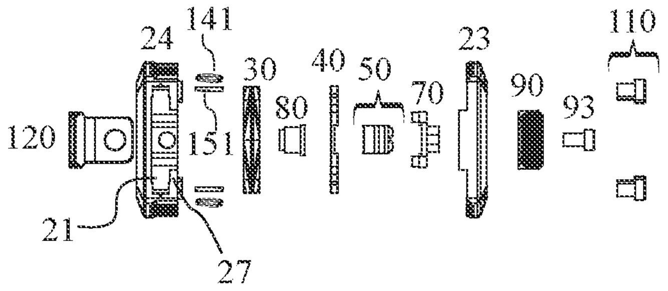
FIG. 6B is a front exploded view of the present invention.

As shown in FIG. 6A and FIG. 6B, the handle 20 comprises a blade channel 21 and an allowed length of blade travel. The blade channel 21 receives the blade 30 at least partially. The blade channel 21 allows the blade 30 to travel along the blade channel 21 as it is deployed and retracted. The blade 30 further comprises an axel hole 33, a set of lateral notches 31 and a set of locking feet 32 at a base end of the blade. The set of locking feet 32 comprise tabular protrusions at the base end of the blade to assist in locking the blade 30 in the deployment position. The set of locking feet 32 define a tang notch 35. The set of lateral notches 31 are to assist in locking the blade 30 in the retracted position.

Figure 8:
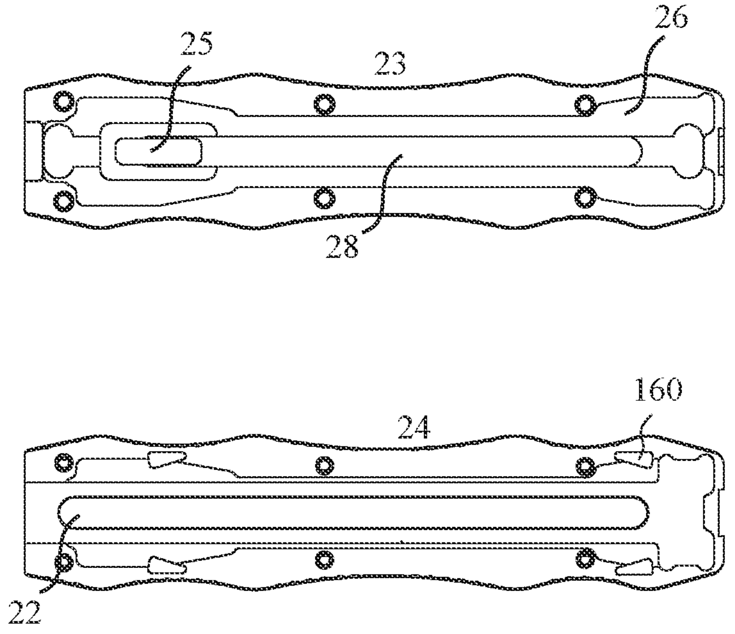
FIG. 8 is a cut away view of the top shell and the bottom shell of the present invention.

The OTF knife 10 further comprises a support frame 40, an actuation mechanism 50, a toggle opening 25, a sliding shoe 70 and an axel 80. As shown in FIG. 8, the handle 20 comprises an actuation mechanism channel 28 and a support frame channel 26. The support frame channel 26 is superimposed on the actuation mechanism channel 28. The handle 20 also comprises an axel channel 22. The blade channel 21 is superimposed on the axel channel 22. The support frame channel 26 is at least partially separated from the blade channel 21 by an upper shelf 27. The axel 80 is received at least partially by the axel hole 33 so that the axel 80 extends at least partially on both sides of the blade 30. The axel 80 is received at least partially by the axel channel 22. The axel 80 and the axel channel 22 work together to guide the blade 30 as it travels in the blade channel 21. The support frame 40 comprises a plurality of wings 45. In the first preferred embodiment, the support frame comprises a set of front wings 41 and a set of back wings 42. The set of back wings 42 defines a frame notch 46. The support frame 40 also comprises a central channel 44. The central channel 44 receives at least partially the actuation mechanism 50. As shown in FIG. 7A and FIG. 7B, the set of front wings 41 allows for the unlocking of the blade 30 from the deployed position and the set of back wings 42 allows for the unlocking of the blade 30 from the retracted position.

The sliding shoe 70 comprises a locking bar channel 71 on a sliding shoe bottom side. The sliding shoe 70 is mounted to the support frame 40. The toggle switch 90 is fastened to a top side of the sliding shoe 70 through the toggle opening 25 by a toggle fastener 93 and a toggle fastener hole 92. In the first preferred embodiment, the sliding shoe 70 is mounted to the support frame 40 by a plurality of sliding shoe holes in the support frame 40 and a plurality of sliding shoe protrusions on the sliding shoe bottom side on the periphery of the locking bar channel 71 but is not meant to be limiting. The toggle switch 90 is fastened to the sliding shoe 70 with a bolt but is not limited to this.

When the handle 20 and the support frame 40 are mated together, the actuation mechanism 50 is positioned in the actuation mechanism channel 28 and the central channel 44 to allow for the operation of the actuation mechanism 50 for deploying and retracting the blade 30. The support frame 40 is operably configured with the actuation mechanism 50. The actuation mechanism 50 comprises a front locking bar 51, a back locking bar 55, and at least one actuation spring 60 that connects the front locking bar 51 and the back locking bar 55 together. The locking bar channel 71 receives at least partially the front locking bar 51. As shown in FIG. 7B, when the blade 30 is in the deployed position, the front locking bar 51 will be biased against the axel 80 and the support frame 40. As shown in FIG. 7A, when the blade 30 is in the retracted position, the back locking bar 55 will be biased against the tang notch 35 and the frame notch 46.

The plurality of locking paddles and the plurality of locking springs are configured in the plurality of locking cavities so that the spring tension of the plurality of locking springs causes the plurality of locking springs to press against the plurality of locking paddles so that the plurality of locking paddles extend into the blade channel 21 and the support frame channel 26. When the blade 30 is in the deployed position, the set of front locking paddles 151 extend into the blade channel 21 and the support frame channel 26 such that the set of front locking paddles 151 will be in contact with a base side of the set of locking feet 32 thereby restricting free movement of the blade 30 out of the deployed position. The set of back locking paddles 154 inversely extends into the blade channel 21 and the support frame channel 26 relative to the set of front locking paddles 151. When the blade 30 is in the retracted position, the set of back locking paddles 154 extend into the blade channel 21 and the support frame channel 26 such that the set of back locking paddles 154 are in contact with the set of lateral notches 34 thereby restricting free movement of the blade 30 out of the retracted position.

When the blade 30 is in the retracted position, the toggle switch 90 will be in a rear position along the allowed toggle travel length. When the blade 30 is fully retracted within the handle 20, the back locking bar 55 is disposed against the blade 30 within the tang notch 35 and the front locking bar 51 is disposed against the support frame 26. The set of back locking paddles 154 are disposed against the set of lateral notches 34. To move the blade 30 to the deployed position through the open end of the handle, the toggle switch 90 will be moved to a forward position along the allowed toggle travel length. The sliding shoe 70 and the support frame 40 are moved along with the toggle switch 90 since the sliding shoe 70 is attached to the toggle switch 90 and the support frame 40 is attached to the sliding shoe 70. The set of back wings 42 includes a set of forward sides 420. The set of forward sides 420 are sloped such as the support frame 40 moves forward, the set of forward sides 420 press on the set of back locking paddles 154. The set of back locking paddles 154 then compresses the set of back locking springs 144 allowing the set of back locking paddles 154 to contract back into the set of back locking cavities 164. The front locking bar 51 being in contact with the support frame 40 between the set of front wings 41 is moved in a forward direction thereby extending the actuation spring 60 and putting the actuation spring 60 in increased tension. The actuation spring being in increased tension pulls the back locking bar 55 in the forward direction. The back locking bar 55 being in contact with the tang notch 35 pulls on the blade 30 in the forward direction. With the set of back locking paddles 154 being contracted into the set of back locking cavities 164, the blade 30 is unlocked from the retracted position and travels forward along the blade channel 21 along the allowed length of blade travel. As the blade 30 travels forward, the set of lateral notches 34 come in contact with the set of front locking paddles 151. The set of front locking paddles 151 are angled in such a way, that when the set of lateral notches 34 come in contact with the set of front locking paddles 151 thereby pressing against the set of front locking paddles 151 compressing the set of front locking springs 141 which allows the set of front locking paddles 151 to contract into the set of front locking cavities 161. When the blade 30 reaches a forward terminus along the allowed length of blade travel, the blade 30 has completely passed the set of front locking paddles 151 releasing them to extend back out into the blade channel 21 and the support frame channel 26 thereby locking the blade 30 in the deployed position.

When the blade 30 is in the deployed position, the toggle switch 90 is in a forward position along the allowed toggle travel length. When the blade 30 is fully extended outward from the handle 20, the back locking bar 55 is disposed against the support frame 40 within the frame notch 46 and the front locking bar 51 is disposed against the axel 80. The set of front locking paddles 151 are disposed against the locking feet 32. To move the blade 30 to the retracted position, the toggle switch 90 will be moved to the rear position along the allowed toggle travel length. The sliding shoe 70 and the support frame 40 will move with the toggle switch 90. The set of front wings 41 includes a set of rear sides 410. The set of rear sides 410 are sloped such as to press against the set of front locking paddles 151. The set of front locking paddles 151 then compresses the set of front locking springs 141 allowing the set of front locking paddles 151 to contract back into the set of front locking cavities 161. The back locking bar 55 being in contact with the frame back side is moved in a backward direction thereby extending the actuation spring 60 and putting the actuation spring 60 in increased tension. The actuation spring 60 being in increased tension pulls on the front locking bar 51. The front locking bar 51 being in contact with the axel 80 pulls on the axel 80 and in turn the blade 30 in the backward direction. With the set of front locking paddles 151 being contracted into the set of front locking cavities 161, the blade 30 is unlocked from the deployed position and the blade 30 travels backward along the allowed length of blade travel. As the blade 30 travels backward, the set of locking feet 32 come into contact with the set of back locking paddles 154. With the set of back locking paddles 154 being angled such that when the set of locking feet 32 come in contact with the set of back locking paddles 154, the set of back locking springs 144 are compressed allowing the set of back locking paddles 154 to contract back into the set of back locking cavities 164. When the blade 30 reaches a rear terminus, a length of the blade 30 from the back side up to the set of lateral notches 35 has passed by the set of back locking paddles 154 releasing the compression on the set of back locking springs 144 allowing the set of back locking paddles 154 to extend back out into the blade channel 21 and the support frame channel 26 thereby locking the blade 30 in the retracted position by contacting the set of lateral notches.

With the disclosure herein of the front and the sets of back locking paddles, springs, and cavities, the preferred embodiment of the OTF knife 10 has an increased safety aspect. The strength of the disclosed locking system has increased thereby reducing the possibility of knife operational failure and reducing the risk to the user.

Although the invention has been explained in relation to its preferred embodiment, it is to be understood that many other possible modifications and variations can be made without departing from the spirit and scope of the invention.

What is claimed is:

1. An out-the-front knife comprises a handle; a blade; a support frame; an actuation mechanism; a toggle switch; a sliding shoe; an axel; the handle further comprises: a blade channel, a support frame channel, an axel channel, a set of front locking springs, a set of front locking paddles, a set of front locking cavities, a set of back locking springs, a set of back locking paddles, and a set of back locking cavities; the blade further comprises: an axel hole, a set of lateral notches, and a set of locking feet; the support frame further comprises: a set of front wings, a set of back wings; and the actuation mechanism further comprises: a front locking bar, a back locking bar, and at least one actuation spring; the blade channel receives the blade; the blade channel is configured to allow the blade to travel along said blade channel; the support frame is operably configured with the actuation mechanism; the support frame channel receives the support frame; the sliding shoe is mounted to the support frame; the toggle switch is fastened to the sliding shoe; the axel is received at least partially by the axel hole; the axel is received at least partially by the axel channel; the set of front locking springs presses on the set of front locking paddles so that the set of front locking paddles extend into the blade channel; the set of back locking springs presses on the set of back locking paddles so that the set of back locking paddles extend into the blade channel and the support frame channel; the set of locking feet define a tang notch; and the set of back wings define a frame notch; when the blade is fully retracted within the handle, the back locking bar is disposed against the blade within the tang notch; when the blade is fully retracted within the handle, the front locking bar is disposed against the support frame between the set of front wings; when the blade is fully retracted within the handle, the set of back locking paddles are disposed against the set of lateral notches; when the blade is fully extended outward from the handle, the back locking bar is disposed against the support frame within the frame notch; when the blade is fully extended outward from the handle, the front locking bar is disposed against the axel; when the blade is fully extended outward from the handle, the set of front locking paddles are disposed against the locking feet.

2. The out-the-front knife as claimed in claim 1 wherein the support frame channel is superimposed on the actuation mechanism channel.

3. The out-the-front knife as claimed in claim 2 wherein the blade channel is superimposed on the axel channel.

4. The out-the-front as claimed in claim 1 wherein: the set of front wings include a set of rear sides; and the set of rear sides are sloped; when the support frame is moved rearward, the set of rear sides press on the set of front locking paddles.

5. The out-the-front knife as claimed in claim 4 wherein: the set of back wings include a set of forward sides; and the set of forward sides are sloped; when the support frame is moved forward, the set of forward sides press on the set of back locking paddles.

6. The out-the-front knife as claimed in claim 1 further comprises: a clip; a breaker nub; the clip being fastened to the handle with the breaker nub.

7. The out-the-front knife as claimed in claim 5 wherein the handle further comprises: a top shell; a bottom shell; a plurality of fasteners; a plurality of fastener holes; the top shell and the bottom shell are mated.

8. The out-the-front knife as claimed in claim 5 wherein the set of back locking paddles are inversely angled relative to the set of front locking paddles.

9. An out-the-front knife comprises a handle; a blade; a support frame; an actuation mechanism; a toggle switch; a sliding shoe; an axel; the handle further comprises: a blade channel, a support frame channel, an axel channel, a set of front locking springs, a set of front locking paddles, a set of front locking cavities, a set of back locking springs, a set of back locking paddles, a set of back locking cavities, a top shell; a bottom shell; a plurality of fasteners; a plurality of fastener holes; the blade further comprises: an axel hole, a set of lateral notches, and a set of locking feet; the support frame further comprises: a set of front wings, a set of back wings; and the actuation mechanism further comprises: a front locking bar, a back locking bar, and at least one actuation spring; the blade channel receives the blade; the blade channel is configured to allow the blade to travel along said blade channel; the support frame is operably configured with the actuation mechanism; the support frame channel receives the support frame; the sliding shoe is mounted to the support frame; the toggle switch is fastened to the sliding shoe; the axel is received at least partially by the axel hole; the axel is received at least partially by the axel channel; the set of front locking springs presses on the set of front locking paddles so that the set of front locking paddles extend into the blade channel; the set of back locking springs presses on the set of back locking paddles so that the set of back locking paddles extend into the blade channel and the support frame channel; the set of locking feet define a tang notch; and the set of back wings define a frame notch; when the blade is fully retracted within the handle, the back locking bar is disposed against the blade within the tang notch; when the blade is fully retracted within the handle, the front locking bar is disposed against the support frame between the set of front wings; when the blade is fully retracted within the handle, the set of back locking paddles are disposed against the set of lateral notches; when the blade is fully extended outward from the handle, the back locking bar is disposed against the support frame within the frame notch; when the blade is fully extended outward from the handle, the front locking bar is disposed against the axel; when the blade is fully extended outward from the handle, the set of front locking paddles are disposed against the locking feet.

10. The out-the-front knife as claimed in claim 9 wherein the support frame channel is superimposed on the actuation mechanism channel.

11. The out-the-front knife as claimed in claim 10 wherein the blade channel is superimposed on the axel channel.

12. The out-the-front knife as claimed in claim 9 wherein the set of back locking paddles are inversely angled relative to the set of front locking paddles.

13. The out-the-front knife as claimed in claim 9 wherein: the set of front wings include a set of rear sides; and the set of rear sides are sloped; when the support frame is moved rearward, the set of rear sides press on the set of front locking paddles.

14. The out-the-front knife as claimed in claim 10 wherein: the set of back wings include a set of forward sides; and the set of forward sides are sloped; when the support frame is moved forward, the set of forward sides press on the set of back locking paddles.

15. The out-the-front knife as claimed in claim 9 further comprises: a clip; a breaker nub; and the clip being fastened to the handle with the breaker nub.

* * * * *